United States Patent
Ward et al.

(10) Patent No.: US 6,556,565 B1
(45) Date of Patent: Apr. 29, 2003

(54) INTERNET PROTOCOL (IP) TELECOMMUNICATION

(75) Inventors: David P. Ward, Belleville (CA); Cuthbert Cheung, Belleville (CA); John Marshall, Belleville (CA); Ian Astle, Amherstview (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/247,915

(22) Filed: Feb. 11, 1999

Related U.S. Application Data

(60) Provisional application No. 60/091,457, filed on Jul. 1, 1998.

(51) Int. Cl.⁷ .............................................. H04L 12/66
(52) U.S. Cl. ...................................... 370/356; 370/493
(58) Field of Search ................................ 370/493, 356, 370/261, 466, 395, 468, 469, 471, 230, 271, 401, 236, 352; 709/226, 223, 224; 379/114, 231

(56) References Cited

U.S. PATENT DOCUMENTS

| | | | | |
|---|---|---|---|---|
| 5,761,294 A | * | 6/1998 | Shaffer et al. | 379/230 |
| 5,764,645 A | * | 6/1998 | Bernet et al. | 370/466 |
| 5,892,764 A | * | 4/1999 | Riemann et al. | 370/401 |
| 5,944,795 A | * | 8/1999 | Civanlar | 709/227 |
| 6,032,272 A | * | 2/2000 | Soirinsuo et al. | 714/706 |
| 6,044,081 A | * | 3/2000 | Bell et al. | 370/352 |
| 6,137,869 A | * | 10/2000 | Voit et al. | 379/114 |
| 6,154,776 A | * | 11/2000 | Martin | 709/226 |
| 6,175,871 B1 | * | 1/2001 | Schuster et al. | 709/231 |
| 6,282,192 B1 | * | 8/2001 | Murphy et al. | 370/352 |
| 6,363,065 B1 | * | 3/2002 | Thornton et al. | 370/352 |

FOREIGN PATENT DOCUMENTS

| | | | | |
|---|---|---|---|---|
| EP | | 1111859 A2 | * 11/2000 | 370/352 |

OTHER PUBLICATIONS

Thomas A., et al, "Asynchronous Time–Division Techniques: An Experimental Packet Network Intergrating Videocommunication", International Switching Symposium (ISS), Florence, Italy, May 7–11, 1984, Session 32C, Paper 2, pp. 1–7.

Coundreuse, J–P., et al, "Prelude: An Asynchronous Time–Division Switched Network", IEEE International Conference on Communications, Jun. 9, 1987, vol. 2 of 3, pp. 0769–0773.

* cited by examiner

*Primary Examiner*—Hassan Kizou
*Assistant Examiner*—Anh-Vu H Ly
(74) *Attorney, Agent, or Firm*—Nortel Networks

(57) ABSTRACT

A quality of service (QOS) server gathers information in relation to transport introduced delays and obliterations of so called real-time protocol (RTP) signal streams which are used to packetize signals of synchronous signals origins, for example origins such as telephones and raster scan apparatus, for transport via the IP network. The QOS server is able to provide recently gathered QOS information about a requested call, apriori the actual call set up. In an example of a PBX call centre, an automatic dialler is coupled with a QOS server and in relation to endpoint and route selected data, determines if an IP telephony call should proceed, contingent upon the probable QOS being sufficient, before a call controller initiates a call set up.

21 Claims, 7 Drawing Sheets

INTERNET PROTOCOL (IP) TELECOMMUNICATION

This application claims benefit of Provisional Application No. 60/091457 filed Jul. 1, 1998.

The invention generally relates to long distance communications and more particularly to apparatus and methods for assessing whether or not a link or a path between endpoints in an internet protocol (IP) network is potentially suitable for transmission of telecommunications signals of synchronous signals origin. Examples of sources and destinations of such signals may include, but are not limited to, any of voice, data and image terminal apparatus or any combination thereof.

BACKGROUND

In telecommunications, time is an essential component in the information content of signals representing audible sounds and in the signal formats of many visibly reproducible signals, such as television signals. By contrast in data communications, preservation of the time component is not nearly so important. The field of telecommunications has long been operated on the basis of circuit switching principles for providing voice communications. In the later half of this century circuit switching networks have carried an ever increasing volume of data communications. The typical telecommunications digital network for communications of voice, digitally encoded in accordance with a pulse code modulation (PCM) standard, provides a continuous bit rate service that is concatenated as n×64 Kb/s channels. Such telecommunications facilities and networks are said to be circuit switched or synchronous networks, which by their physical natures are most suited to transporting signals between communications terminals which produce synchronous signals, for example telephone speech signals. The primary characteristic of circuit switching is that when one or more physical channels are assigned to a given communication circuit, to provide a service, that channel assignment is reserved for the exclusive use of that service continuously throughout the duration of the service provision. This characteristic of circuit switching is substantially irrelevant for data communications and is of such cost that alternatives, known as packet switched networks, have been developed for the express purpose of providing less costly data communications.

Some time ago, a packet switch, with the trademark SL1 was introduced by the assignee, for improving the efficient transport of data signals. In contrast to the steady repetitive nature of PCM signals, data signals for the most part, are bursty or asynchronous in nature. Thus to accommodate the efficient transmission of data signals, a data burst is arranged into a packet of convenient length along with a header which specifies a destination. After a packet has been assembled, a high speed transmission path is allocated, only for a time sufficient to transport the packet of data toward its destination. During the packet transport, the packet is in sole possession of the transmission path. After the packet is transported, the transmission path is available for the transport of another packet, possibly from a different source. The event of transporting at least one packet of data from a point of origin to a point of destination is termed a data call, however, the number of data packets transmitted throughout the duration of a data call is generally unlimited. Packet networks operated in accordance with the internet protocol (IP) have recently become the data communications equivalent of the publicly accessible switched telephone networks (PSTNs). Users of data communications services commonly refer to the "internet" in the same fashion as users of voice communications refer to the "telephone". If considered on a basis of bulk data transport per unit of cost, the transport of information signals using the IP is very economical as compared with the PSTN. Although digitized voice can be transported via a packet network operated in accordance with the IP, the wide variances of delay caused by the operating characteristics of an IP network tend to deteriorate, distort and occasionally even obliterate the time component. Interrupted, delayed and out of sequenced reception of voice signal packets are common occurrences from time to time in a typical packet system, particularly during higher traffic periods. In other words the IP does not provide a consistent quality of service (QOS) for voice communications and the like.

The general evolution of packet systems toward functionality as broad band carriers of information of synchronous origin is exemplified in a paper by A. Thomas et al, titled Asynchronous Time-Division Techniques: An Experimental Packet Network Integrating Video communication, which was published at the 1984 International Switching Symposium, May 7–11 in Florence Italy. Another example was published in a 1987 IEEE paper by Jean-Pierre Coudreuse and Michel Serval, titled Prelude: An Asynchronous Time-division Switched Network.

More recently, a broadband communications standard for supporting a variety of both synchronous and asynchronous communication requirements has been widely adopted by telecommunications providers, and is now referred to as the asynchronous transfer mode (ATM) of telecommunications. The recommended standards are defined by the ATM Forum and are available from several publishers including Prentice Hall of Englwood Cliffs, N.J. 07632, under the title ATM User-Network Interface Specification Version 3.0 (ISBN 0-13-2258633). One commercially available product is sold by the assignee with the trademark Magellan. Networks operable in the ATM standard are usually termed ATM systems or ATM networks. ATM systems are sophistically compromised to preserve the essence of the time component in synchronous signals yet to some extent reap the economies of packet switching. However, as the IP is strictly directed to the efficient transport of data through any packet network facility, accordingly the IP does not take advantage of the ATM potential for preserving the time component.

The quality of audible speech, reproduced from IP transport, may approach the quality of signals transmitted via the PSTN. Such is usually contingent upon all of the packet network facilities, involved with the transport of the signals, being operated at small fractions,of their capacities. Otherwise the quality may degenerate such that verbal information becomes unintelligible. Never the less, it has become commonplace for some personal computer users to link with an IP network for telephone like voice communications, as well as for data communications. Economies envisaged with utilization of IP networks for synchronous signals communications, have generated considerable development in adaptations of end terminal facilities and software. These adaptations provide degrees of compensation for the irregular delays in packet transport to improve the quality of audibly reproduced speech.

Commercial entities which depend heavily upon telecommunications usage, for their activities, spend significantly upon purchases of telephony services from PSTN and other circuit switched telephone service providers. For some time they have considereded the IP, wishing it were a practical alternative. Improvements in the adaptation of end terminal facilities and software for telephone conversations have made the IP network a potentially practical alternative to the PSTNs. Users depending heavily upon telecommunications find the potential low cost of usage of IP in comparison with the PSTN to be very attractive. Nevertheless, this attraction is tempered with the recognition that from time to time one or more links between the network endpoints related to a telephone call may provide such poor QOS as to be unacceptable. Furthermore the QOS can be unpredictably variable, changing from good to marginal to bad and to good again within an hour.

The effects of packet delays and losses as well as end terminal clocking dissimilarities are discussed in a previous U.S. patent application Ser. No. 08/982,925 assigned to Northern Telecom Ltd., the assignee of this application. The previous application teaches improvements useful in telephone facilities, terminals and personal computers which reduce the potentially deleterious effects of an IP network involved in speech transmission. However, there are practical limits to the effectiveness of these improvements, while there is no limit to the degradation of the performance of an IP link in a packet network.

In the jargon of the IP, a real-time transport protocol has been introduced to distinguish signals of synchronous origin from typical data signals. A signal of synchronous origin is usually referred to as a real-time transport protocol (RTP) stream. This does nothing to expedite the regular transport of these signals, however it has permitted the use of a real-time transport control protocol (RTCP). The RTCP is one of several protocols useful for collecting data relative to characteristics having been inflicted upon RTP streams, while traversing the IP network. Both the RTP and the RTCP are published in standards recommended by the International Telecommunications Union. There are also software tools available which will analyze the collected data and interpret the characteristics of data collected by the RTCP. In other words, such software tool assesses the QOS being momentarily provided via a path of propagation through the IP network. Examples of these software tools are available under the trademarks of V/IP Trunk from Micom, and IP Telecommuter and Road Warrior both from Northern Telecom. Each of these software mechanisms includes functions which take a measure of the performance of an IP connection for synchronous data, such as a telephone call after the call has progressed to a conversation. Of course if the connection provides transport of inadequate quality for real-time voice, the parties to the conversation may very well realize it without the benefit of what is essentially a post performance assessment of the RTP stream. At least one party will likely notice the conversation received from the other party as being delayed, broken or otherwise unsatisfactory. Consequently, as far as telephone voice communications are concerned, many if not most commercial entities are reluctant to becoming committed internet telephony users, as for purposes of their activities, a guaranteed QOS similar to the QOS of the PSTN is virtually essential.

SUMMARY OF THE INVENTION

In accordance with the invention, an assessment of a probable QOS for routing an intended telephony call via an IP network is acquired, apriori to actually establishing the telephone call.

In one example, RTCP information, about RTP streams having recently traversed links related to a specific path in the IP network, is gathered to determine, apriori setup of a requested call, a QOS of an IP network path.

More particularly, a quality of service (QOS) server, in combination with an IP network, is responsive to IP path definitions provided thereto from a telecommunications entity coupled with the IP network, for from time to time collecting data relative to characteristics of real-time transport protocol (RTP) streams used for transporting real-time audio data via one of more links in an IP network path.

In one application of the invention a call centre including agent stations, is responsive to data relative to characteristics of real-time transport protocol streams used for transporting real-time audio data via IP paths in an IP network, for selectively postponing an IP telephone call setup with one of the agent stations in an instance wherein the data indicates a probable QOS of less than a predetermined QOS.

In one example the call centre is operative in combination with a quality of service (QOS) server to accommodate outgoing call completions via either of a PSTN and a packet switched network. The call centre comprises a telephone circuit switching network being coupled via trunk circuits to a PSTN, and being coupled via a gateway means to a packet switched network, the telephone circuit switching network being operable to provide communications channels between any of a plurality of agent stations and the gateway means, and to provide communications channels between any of the plurality of agent stations and the trunk circuits. A call controller directs the operations of the telephone circuit switching network for setting up and tearing down telephone calls, such that calls for completion via the trunk circuits are preceded by signalling information specifying at least the telephone number of a called party, and such that calls for completion via the gateway means are preceded by signalling information as to the telephone number of a called party as well as a corresponding IP network endpoint address. An automatic dialler is coupled to communicate with the call controller for providing telephone numbers in association with endpoint addresses when requested by the call controller, and is coupled with the QOS server. The automatic dialler comprises a number list for storing a plurality of telephone numbers along with corresponding endpoint addresses of parties to be called. A calling list controller reads and writes the number list, and apriori to providing a telephone number for use by the call controller, the calling list controller is operable to request and receive QOS information from the QOS server in relation to the endpoint addresses of the call centre's gateway and an endpoint associated with said telephone number. The calling list controller is further operable to decline provisioning of said telephone number in consequence of a value of said QOS information. Hence in an IP voice call, a predetermined acceptable QOS can be virtually guaranteed.

The automatic dialler in one example includes a deferred list and a called list, in addition to the number list. The deferred list, is for recording telephone numbers for which provisioning was declined. The called list is for storing each telephone number read in the telephone number list and resulting in an IP telephone call setup with a called party having been performed. In this example the calling list controller is responsive to a completion of a reading of all the numbers in the telephone number list for functionally substituting the deferred list; and is responsive to a signal from an agent station during a progress of a telephone connection following the call setup for causing the telephone number of the called party to be recorded in the deferred list.

A method for routing a telephone call via an IP network, is performed in response to a calling party having initiated a call to a called party. The method includes the step of determining at least one IP network link for transport of packets from the calling party to the called party, and at least one IP network link for transport of packets from the called party to the calling party. In accordance with the invention the method comprising the further steps of:

collecting data relative to characteristics of any real-time transport protocol (RTP) streams having recently been transported via said links;

generating a historical quality of service (QOS) value from the collected data; and setting up the call between the calling and called parties via the IP network, contingent upon the historical QOS value being of at least a predefined QOS;

whereby the setting up an IP network telephony call with a poor QOS is substantially avoided.

The invention provides a method for estimating a telephony quality of service between endpoints in an internet protocol (IP) network. The method requires a data storage facility coupled with the IP network to act as a quality of service (QOS) server. The method is responsive to an exchange of signal streams of synchronous origins at an endpoint and comprises the steps of:

a) gathering performance information for a signal stream received at the end point, b) gathering route information identifying at least one route having been traversed by said signal stream, c) transferring the gathered information to the data storage facility; and in response to each transfer of said gathered information, at the data storage facility, d) storing the performance information, and the route information;

whereby the stored information are available apriori a call setup for a request of telephone service involving endpoints having at least a potential transport route in common with a route identified in the stored route information.

Following the request for telephone service, the method comprises the further steps of:

e) identifying IP network endpoints of the calling and called parties, f) transmitting a request for QOS information relative to each of the identified endpoints, g) responsive to said request, in the QOS server, reading any QOS information for which there is at least a potential transport route in common with a route identified in the stored route information, and h) transporting any QOS information, read in step d), to the requester, whereby set up of the requested telephone call via the IP network may be declined if the QOS information appears to indicate less than a prescribed QOS.

INTRODUCTION OF THE DRAWINGS

Example embodiments of the invention are discussed with reference to the accompanying drawings in which.

DESCRIPTION OF THE EXAMPLE EMBODIMENT

Figure 1:
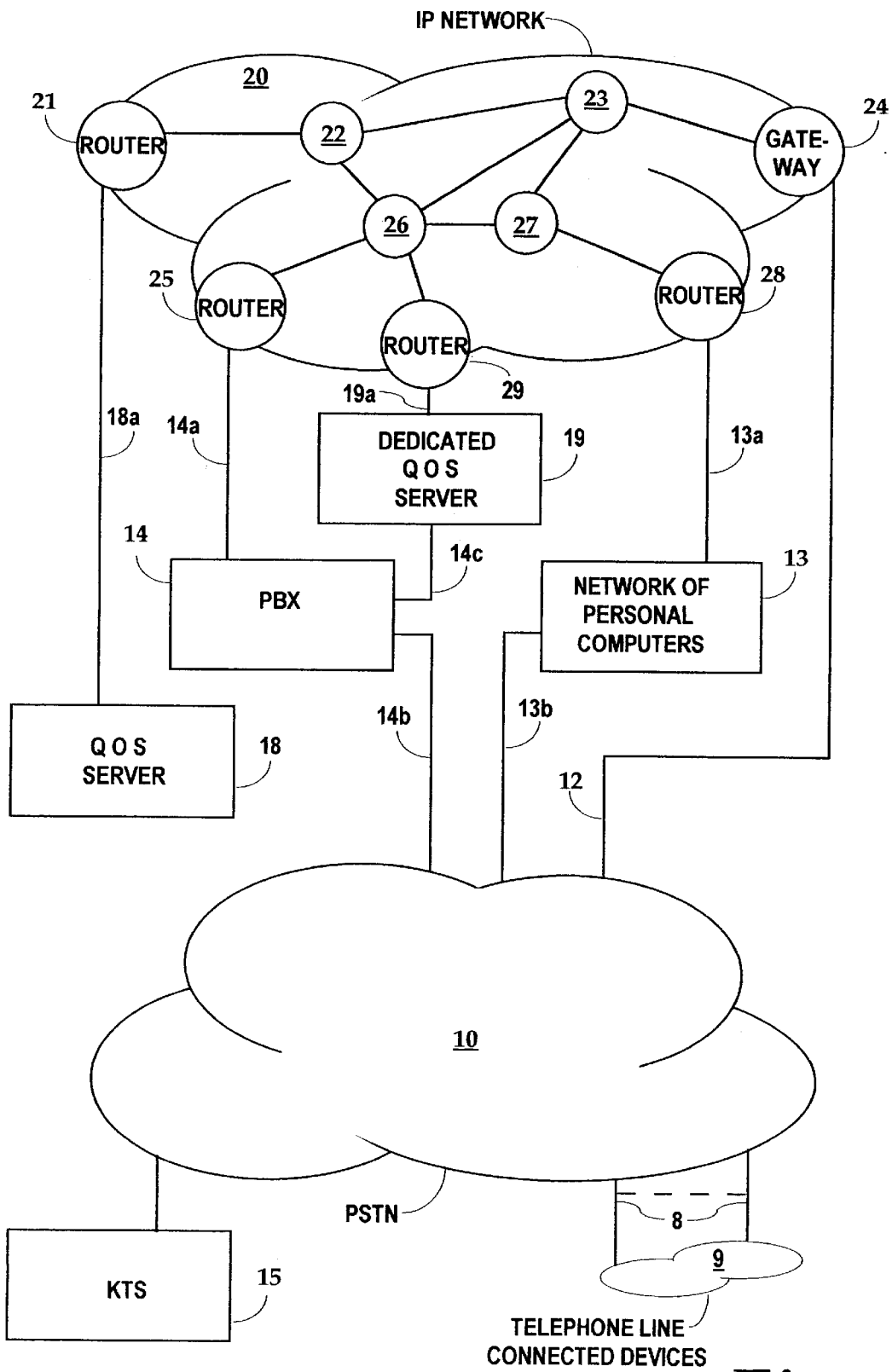
FIG. 1 is a block schematic diagram of an IP network and a PSTN network for coupling telecommunications devices and facilities such that telecommunications may be conducted between any of the telecommunications devices and facilities via either of the IP network and the PSTN, in accordance with the invention.

Points of origin of synchronous telecommunications signals, potentially transmittable via the IP network, are located at scattered locations around the globe and may transmit at any time to one or more points of destination. These points of origin and destination may include telecommunications devices or telecommunications facilities, as well as computers ranging from small personal computers to large main frame computers. In FIG. 1 a public switched telephone network (PSTN) 10 is shown with a multitude of telephone devices 9, connected thereto via a corresponding multitude of telephone lines 8. Some examples of telephone devices include but are not limited to subscriber telephones, facsimile machines, image cameras and displays, modem interfaced apparatus and the like. The PSTN 10 is also illustrated as connected to provide telephone service for a PBX 14 via a trunk facility 14b and a key telephone system (KTS) 15. It can be summarized that the typical PSTN can provide telecommunications services for a wide variety of communications facilities and devices not all of which are shown in the figures.

Access between the PSTN 10 and an IP network 20 is typically provided at multiple locations across a continent and is exemplified in FIG. 1 as a communications link 12 terminated at a gateway 24. The gateway 24 transfers information between the operating signal formats of the PSTN and the IP network, the former typically being a TDM PCM format, and the later being a data packet format in accordance with the IP. The PBX 14 is coupled to a router 24 in the IP network 20 via a link 14a and is also coupled to the PSTN 10 via a trunk 14b. A QOS server 18 is coupled via a link 18a with an IP network router 21, to be generally available as a network resource. Another QOS server 19 is dedicated to serving the PBX 14. The dedicated QOS server 19 is connected to the PBX 14 via a link 14c and coupled to an IP network router 29 via a link 19a. By way of example, a network 13 of personal computers is shown linked via a link 13a to an IP network router 28, and coupled to the PSTN 10 via a trunk 13b. The IP network 20 is also depicted as including paths, routes or links intersecting at IP network nodes 22, 23, 26, and 27. In actual fact packet networks have multitudes of gateways or service endpoints and a multitude of nodes linked therebetween, however this is not further discussed, as the particular structures representative of IP operative networks are not pertinent to an appreciation of the invention.

Both the PSTN 10 and the IP network 20 are capable of providing communications between a multitude of entities which may be coupled thereto, however, as discussed in the background, the IP network operates by data packet transmissions while the PSTN operates by switched circuit synchronous signal transmissions.

As before discussed the economies of using the IP network for communications has lead to various arrangements for minimizing the deleterious intrusive nature of the IP network in regards to the transmission of voice signals and the like in a so-called RTP stream. Also as before mentioned there are also software tools available which will analyze the collected data to determine the characteristics of an RTP stream. In this example the QOS servers 18 and 19 are each implemented by computer apparatus (not shown) which is dedicated to collecting information about the flow of any RTP streams in the IP network 20. The QOS server 18 is available to answer requests from other entities connected to the IP network 20 by transmitting the latest data collected about the flow of RTP streams via any specified link or between specified endpoints. The requesting terminal or device may then determine the probable QOS of the link or links in the IP network path over which the signals will be transported during a telephone call. The KTS in this case may conveniently be a Norstar, available from Northern Telecom Ltd. The KTS 15 uses the QOS information to decide if a requested telephone call between the endpoints of origin and destination is viable. It is envisaged that any end point devise that may be served by an IP network connection and involved with the origination of synchronous signals will include means by which data representative of recent link performance received from a common resource IP network QOS server is analyzed so that a calling party can be come aware of the probable QOS of the moment and choose either the IP network or the PSTN for completing the call.

The dedicated QOS server 19 is exclusively available to answer requests from the PBX 14, in a similar manner, by transmitting the latest data collected about the recent flow of any RTP streams having been transported by a link or group of links that might be used to complete a telephone call, originating from the PBX 14. Using an appropriate software tool, for example IP Telecommute, the PBX 14 determines the probable QOS of the link or links in the IP network path over which the signals will be transported during the telephone call. The QOS information may be relied upon to determine the disposition of the initiated telephone call, for example to be to be one of routing through the IP network 20, routing through the PSTN 10, or simply refusing to complete the call.

Figure 2:
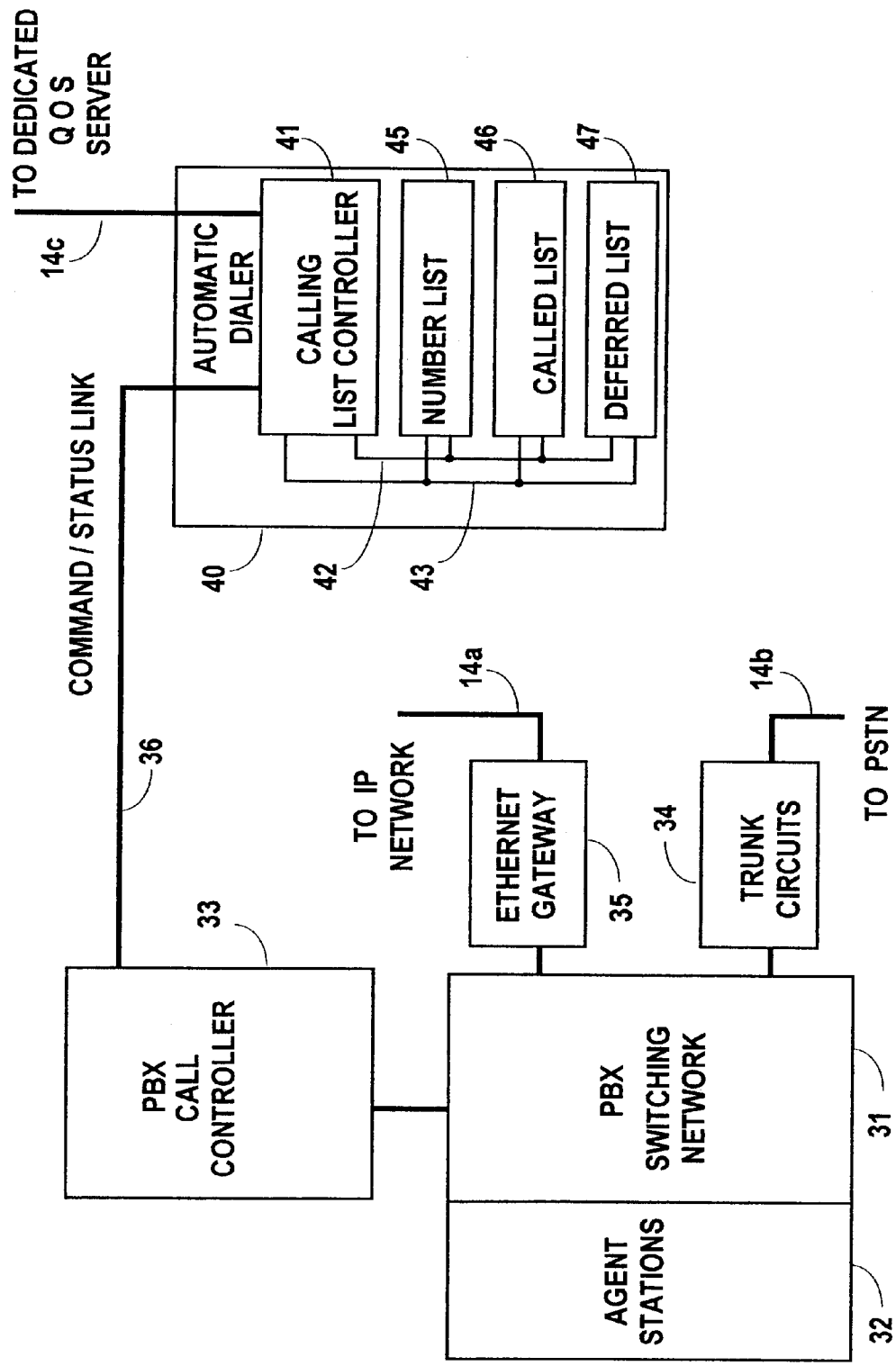
FIG. 2 is a block schematic diagram showing more detail as to a private branch exchange (PBX) used in FIG. 1.

Referring to FIG. 2, the PBX 14 introduced in FIG. 1, is configured in a typical manner to provide a call centre which includes a PBX switching network 31 operated under the direction of a PBX call controller 33. For example in a telemarketing function any of a plurality of agent stations 32 may be coupled to the PSTN 10 via one of trunk circuits 34 and a channel in the trunk 14b, or alternately to the IP network 20 via an Ethernet gateway 35 and the link 14a. The PBX call controller 33 is responsive to call requests, for calling distant parties, as defined by telephone numbers supplied via a command status link 36 by an automatic dialler 40. When a party answers the call is quickly completed to an idle attendant at an agent station. The PBX call controller 33 is capable of processing calls at a rapid rate. However it is normally programmed to pace the call centre such that an answering called party will have the impression that the agent had dialed and was waiting for the party to answer, when in fact the agent may have disconnected from the conversation of a previous call only a moment before.

In this particular example, the automatic dialler 40 is provided as a server element connected to the call controller 33 via a command status link 36. The PBX in this case may conveniently be a Meridian 1, available from Northern Telecom. The automatic dialler 40 includes a calling list controller 41 which manipulates a data base. The data base would normally be contained in a single random access memory device. For ease of illustration, the data base is depicted as being three separate memory devices, each of which is functionally labeled as a number list 45, a called list 46, and a deferred list 47, each being coupled to the calling list controller 41 via a data bus 42 and a control bus 43. It is the calling list controller'responsibility to present numbers for calling one after another to the PBX call controller 33 via the command status link 36.

Operation of the PBX is discussed in more detail with reference to FIGS. 3 and 4. A memory element in the automatic dialler 40 is segmented into the number list 45, the called list 46, and the deferred list 47 as shown in function box 51. To prepare for operation, the function box 52 requires the number list 45 to be loaded with the telephone numbers. The telephone numbers will be those of a selected portion of a population with whom the commercial entity desires to do business or otherwise communicate with. As it is desirous that the IP network 20 be utilized whenever possible, routing information as to appropriate IP network endpoints or gateways is associated with each of the loaded telephone numbers or alternately the telephone numbers are arranged in blocks having common end point addresses. Loading of the telephone numbers and associated endpoint addresses may be performed by physical insertion of a prepared data base in the form of a cassette data tape (not shown) into either of the call controller or the calling list controller. Alternately, such data base information may be received from a remote source (not shown) via the IP network 20, the Ethernet gateway 35 and thence traverse a TDM signalling and supervision channel in the switching network 31 to reach the call controller 33.

Preparatory to the call centre function, as shown at box 53, the calling list controller 41 reads a number and routing information in the number list 45. The calling list controller 41 compares the routing information with any recent entries in the deferred list 47, as required in a decision box 54, to determine if a recently read number with similar routing was declined. If not, according to function box 55, the routing information is transferred to the QOS server 19. As required in decision box 56, if RTP stream data information corresponding to the routing information is of recent record, the QOS server 19 makes the data known to the calling list controller 41, as shown in box 58. However if such data is absent or more than say 5 minutes old, for example, the QOS server collects current data related to the endpoints by initiating an artificial session, which mimicks a call involving RTP streams being exchanged between endpoints of the route through the IP network 20, as shown at 57. The artificial session data is used to update the QOS server and is communicated to the calling list controller 41. An alternate result in the decision box 54, occurs if a recently read number with similar routing was declined and results in a YES. A yes result causes the sequence to transfer at "B" to FIG. 4 function box 65, which is discussed later.

Figure 4:
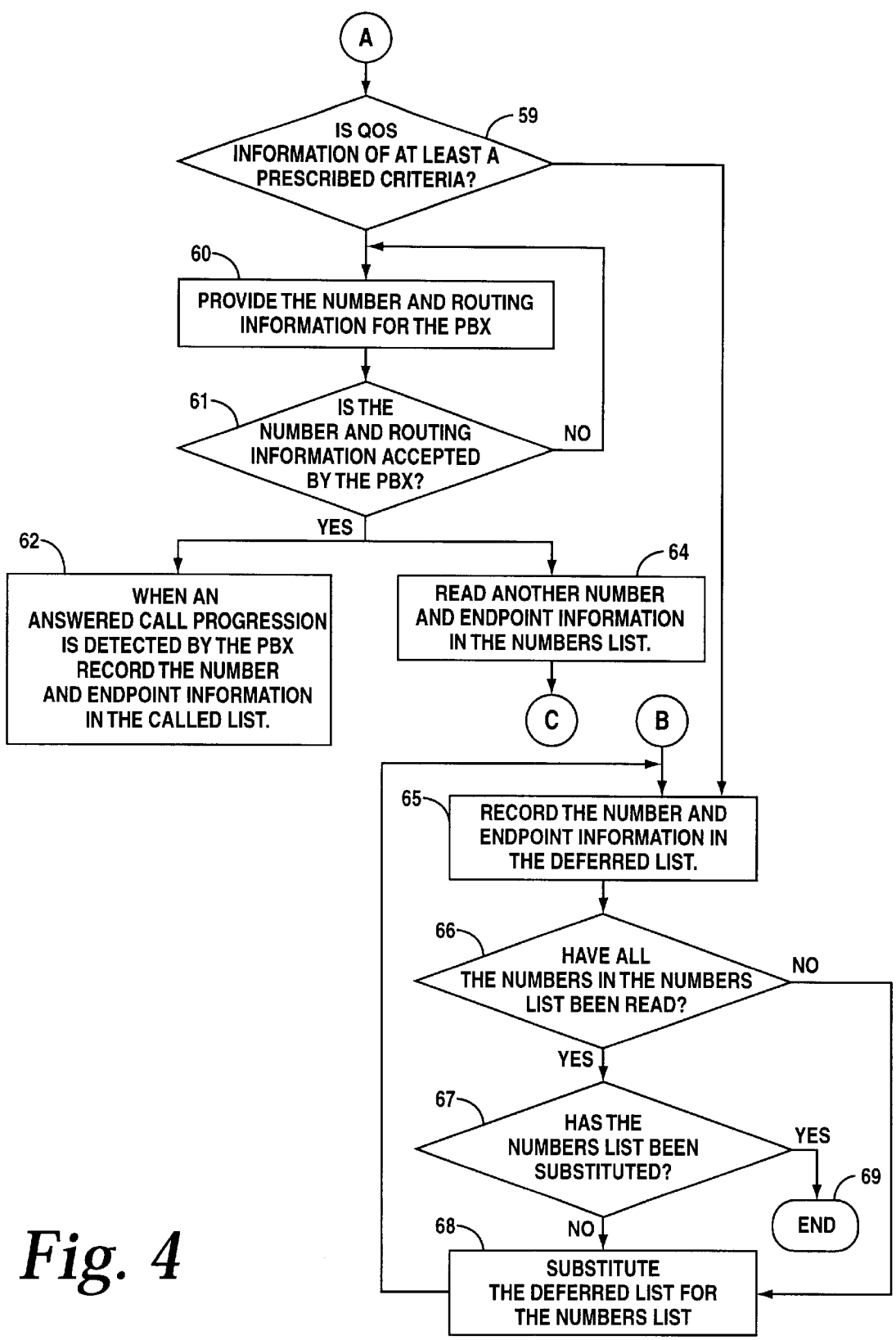

FIG. 4 is entered via "A" from function box 58 where in accordance with decision block 59, the calling list controller 41 determines if the probable QOS is of at least a prescribed criterion. If the QOS is satisfactory the calling list controller 41 provides the telephone number and the routing information via the command/status link 36 for use by the PBX call controller 33, as shown in a function box 60. In accordance with decision block 61, after the telephone number and the routing information is confirmed as having been accepted by the call controller 33, an other number and endpoint information are read from the number list 45 as required in function box 64, and the sequence transfers via "C" to FIG.

3. At the same time the list controller 41 waits to receive an indication from the call controller 33 that the call specified by the previously read telephone number has resulted in a telephone call having progressed to being answered. If and when such occurs, as indicated in function block 62, the corresponding telephone number and endpoint information are written in the called list 46. As an option, after the conversational portion of the call, before going ON HOOK the agent may signal a recall request from the station. The call controller 33 signals the list controller 41 to write the telephone number and the associated endpoint information in a recall list (not shown) for a second call setup request at some later time.

The function box 65, is responsive to a NO assertion at the function block 59, or to a YES assertion as the function. block 54 to require the telephone number and the associated endpoint information be written in the deferred list 47. Decision block 66 tests to see if all the numbers in the number list have been read. If YES, then the calling list controller checks to see if the number list has already been substituted by the deferred list 47, as specified in decision block 67. If NO then the deferred list is substituted and the sequence of functions transfers to function box 64 as required by function box 68. In other words, when the number list 45 has been read in its entirety, the calling list controller 41 substitutes the deferred list 47 instead of the number list 45 as the source of numbers for calling. Transfers of numbers to the PBX call controller 33 are treated in like manner as before described. On the other hand if YES, then the reading of the deferred list 47 has been completed and the process ends at 69.

Thereafter numbers from the call again list may be used to drive the call centre or the number list 45 can be loaded with a new sequence of numbers and the call centre resumes operation.

Figure 3:
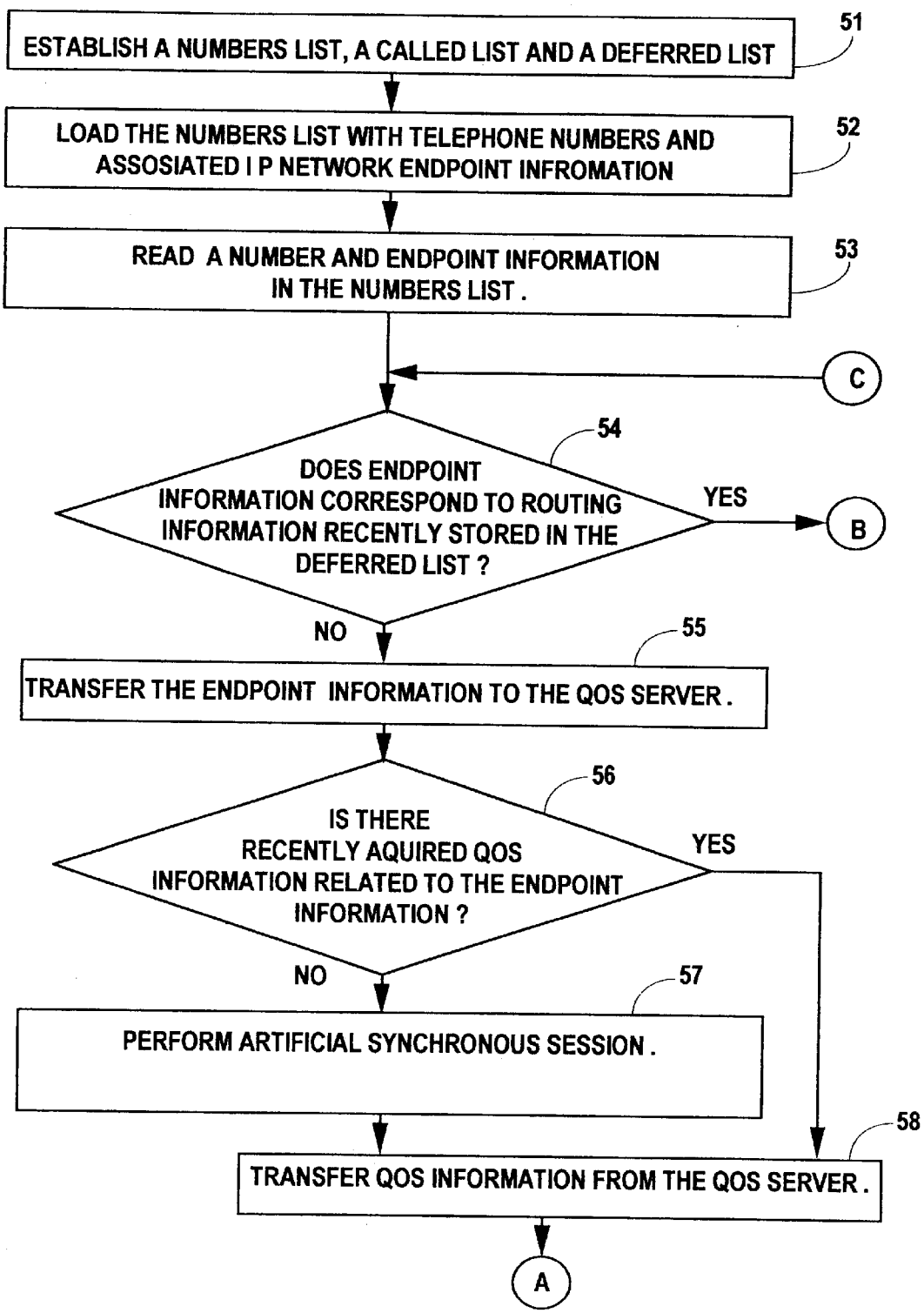
FIGS. 3 and 4 are flow diagrams which illustrate a method by which a PBX call centre feature utilizes the IP network of FIG. 1 for telecommunications, consequent upon QOS information.

In relation to FIGS. 3 and 4, operation of a call centre using the IP network for telecommunications has been discussed. In particular telephone numbers are specified for call setup using the IP, only after a probably adequate QOS has been determined.

In another embodiment, later discussed with reference to FIG. 7, the QOS server is able to specify an IP network node compander function such that the bandwidth of the RTP stream may be compressed for transport via one or more moderately traffic congested links and thereby improve the perceived telephony service.

Figure 5:
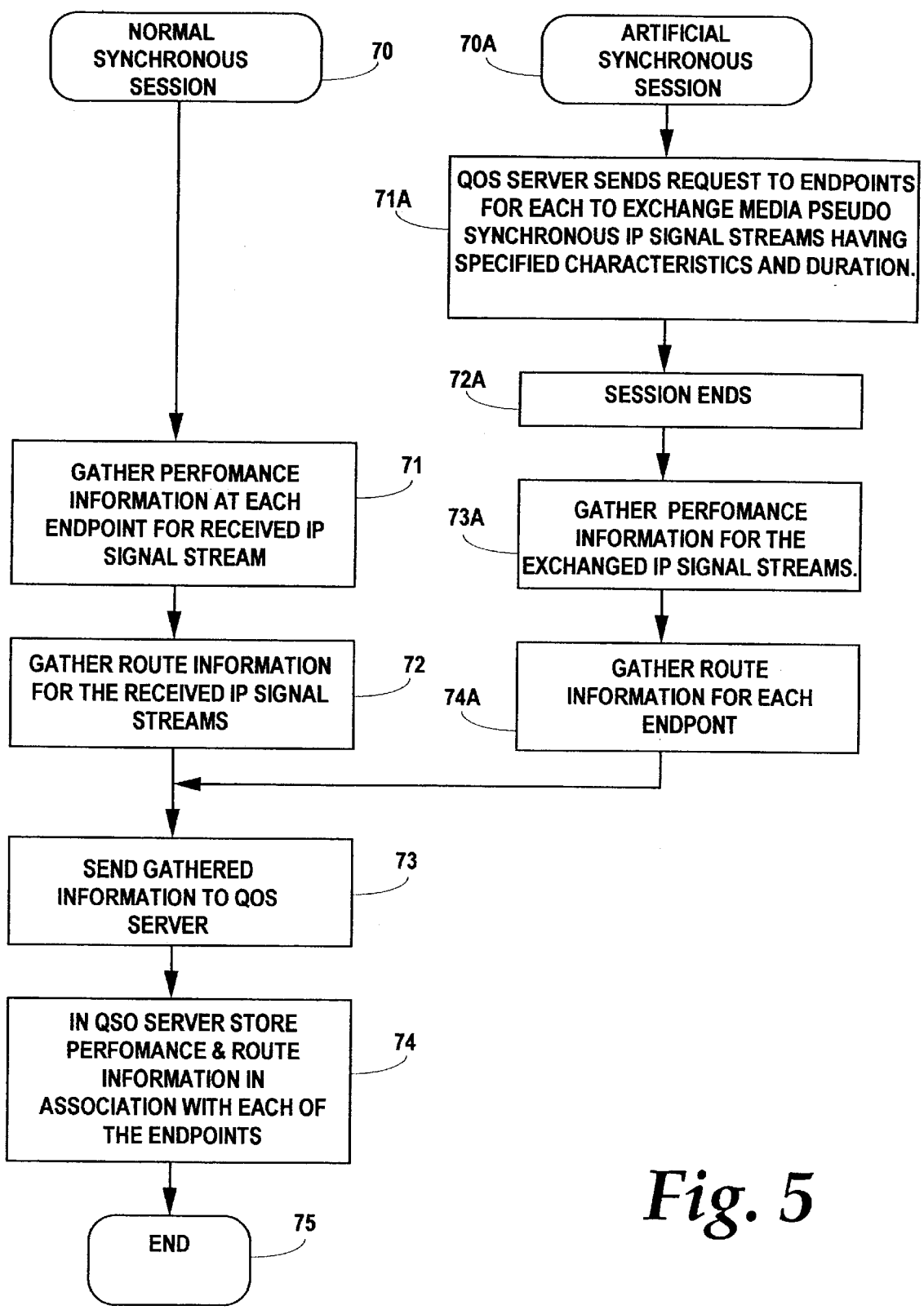
FIG. 5 is a flow diagram which illustrates a method for amassing QOS information in relation to endpoints and routes in the IP network in FIG. 1.

One method by which a QOS server amasses IP telephony QOS information is discussed with reference to FIG. 5. QOS information is amassed in a QOS server by monitoring ongoing traffic so that a short history of performances, each related to a specific route, is obtained. Starting at 70, in a normal IP telephone call, RTP signal streams are exchanged at the endpoints associated with the calling and called parties. The endpoints are instructed to utilize the RTCP to generate information as to the characteristics of the streams, and provide this with related path or route information in one or more data packets addressed for the QOS server, as indicated in function boxes 71, 72 and 73. The QOS server stores the information association with the identities of the endpoints of origin as indicated in function box 74. The process ends as indicated at function box 75, but recommences with each initiation of a normal synchronous session, as shown at 70. The information is selectively available for determining a probable QOS for a requested IP telephone call apriori the actual call set up. However, in the event that no traffic of synchronous signals origin has recently occurred over a particular route, the probability of the previously gathered information being somewhat accurate is depreciated. It is therefore considered to be of no practical value and apriori a call setup an attempt to acquire more up to the moment data can be initiated by requesting an artificial synchronous session, as indicated at 70A in FIG. 5. The artificial synchronous session is controlled by the QOS server which requests the endpoints to exchange media pseudo synchronous signal streams, as indicated at function box 71A. The resulting RTP streams must be of sufficient bulk to facilitate a meaningful examination by the RTCP. After the artificial synchronous session has generated some performance information, the session ends, as shown at 72A, and the information is gathered and forwarded to thee QOS server, where it is stored in accordance with the functions illustrated at function boxes 73A, 74A, 73 and 74.

Figure 6:
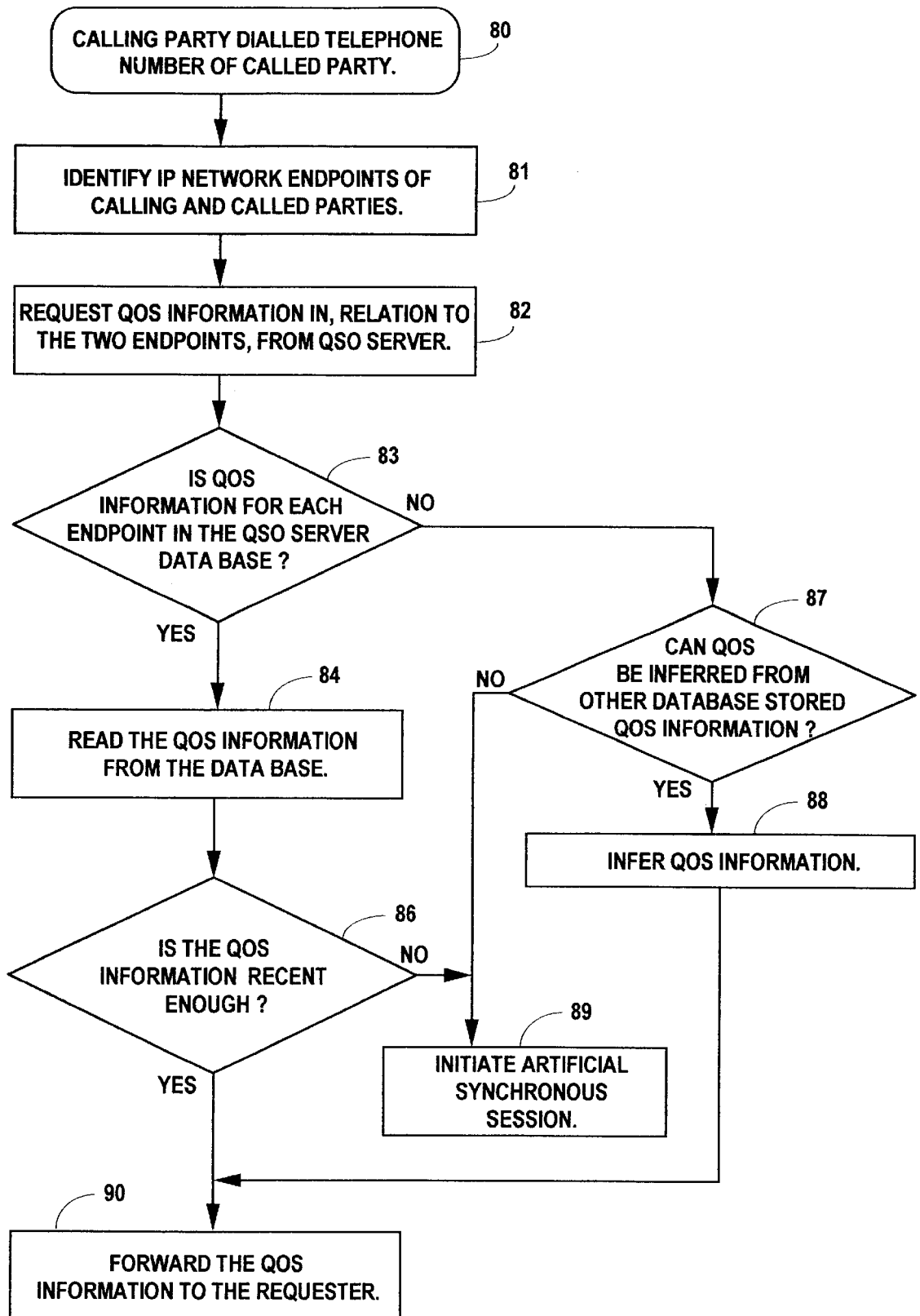
FIG. 6 is a flow diagram which illustrates a method by which a telephone call is setup, consequent upon QOS information in relation to endpoints and routes in the IP network in FIG. 1.

A method by which an IP telephone call is setup, consequent upon the gathered QOS information, is discussed with reference to FIG. 6. In an event of a calling party having dialed or otherwise indicated the telephone number of a called party, as indicated at 80, network endpoints related to the calling and called parties must be identified, as indicated in function box 81. Thereafter QOS information relating to the endpoints is requested from the QOS server, as shown at function box 82. If for example, referring to FIG. 1, the request originates with any of the KTS 15 or telephone line connected devices 9, the request will have been initially transmitted via a TDM channel provided by a local exchange (CO), not shown, in the PSTN 10 to the gateway 24. At the gateway 24 the TDM signal is packetized for transport to the QOS server 18. If for example the request originates at a personal computer in the network of personal computers 13, the request could traverse the PSTN 10 but more efficiently the request is likely to be transported by the router 28 and on via the IP network 20 to the QOS server 18. Referring again to FIG. 6, the QOS server responds to the request by first determining if there is information relating to each of the endpoints within the QOS server, as indicated at a decision block 83. If YES, the QOS information is read, at 84, and examined to see if it is recent, as required at decision block 86. If NO, the artificial synchronous session is initiated as required in a function box 89. If YES, the information is transported toward the requester, as indicated in function box 90. The information is then available for the requesting entity for either indicating the potential QOS, to a user, or available for use directly to automatically determine the progress or disposal of the dialed telephone call.

Again referring to FIG. 6 at the decision block 83, if it is determined there is no information in relation to each of the endpoints, a further decision is specified in a block 87. In this block it is determined if QOS information relating to the endpoints might be inferred. Inference is attractive as it is much faster and uses less resource, compared to initiating an artificial synchronous session. Inference is possible if the endpoint locations are considered, in order to determine a likely route therebetween. If there is QOS recent information for the likely route, it is inferred to be appropriate QOS information at function box 88 and is forwarded to the requester. If the QOS is not inferable an artificial synchronous session is initiated as required at the function box 89.

Figure 7:
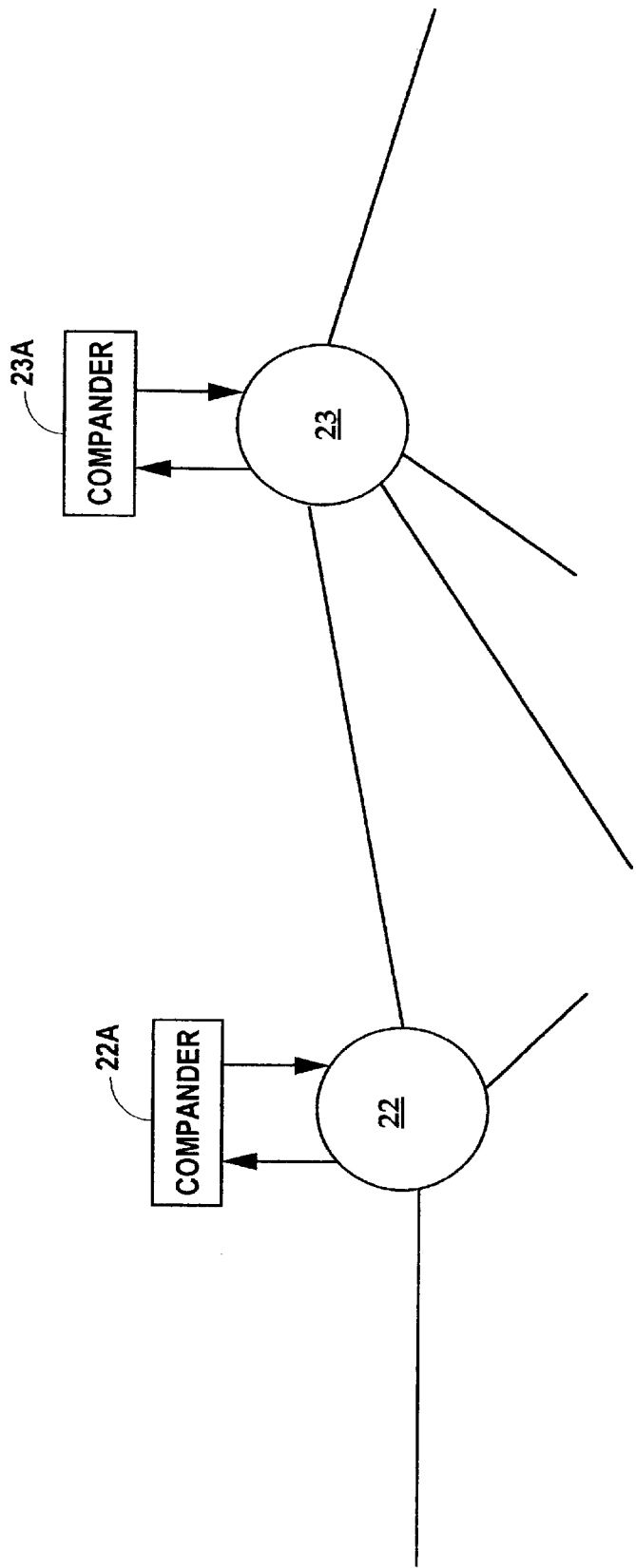
FIG. 7 is a block schematic diagram which illustrates an example of a network resource useful in combination with the IP network of FIG. 1.

Referring to FIG. 7, the IP network nodes 22 and 23 as illustrated in FIG. 1, are also connected in combination with companders 22A and 23A respectively. Companding is a well known function by which the bulk of an information signal is compressed for transmission and subsequently expanded, complimentary to the compression function, for reception and use while maintaining virtually all of the information content. In this example the compander is a device which performs either of a selected compression function or a complimentary expansion function, upon RTP packets of a particular IP telephone call. If a QOS for a requested IP telephone call appears to be somewhat less than a preferred QOS in the link between the nodes 22 and 23, while any alternative links are unacceptable, companding is-used to reduce the signal bulk for transport. Compression of the RTP stream reduces the amount of data signal for transporting the information. Hence the time duration for transport of RTP packets is reduced and accordingly the exposure of the information to IP degradation while traversing the link is reduced. In the example of FIG. 2, the network companding resource is used if the calling list controller 41 receives QOS information which indicates the historical QOS value of a link to be less than the preferred QOS value, but greater than a lesser predefined QOS value. The calling list controller 41 provides link routing instruction along with the endpoint addresses and the telephone number for use by the call controller 33. The link routing instruction includes a request for allocating the network companding resource to the RTP streams to be transported via the link for the duration of the telephone call. By this means parties to the IP telephone call will experience a better QOS than would be available without the companding resource.

In the forgoing discussion, examples of a QOS server, in association with a packet switched network operated with the IP for apriori determining a probable QOS for a requested IP telephone call, have been illustrated. It is envisaged that in the light of this discussion QOS servers will be provided as a common resource in IP networks to better facilitate IP telephony. The principles discussed herein extend generally to signals of synchronous origin, be these conveyers of whatever information. Examples of sources and destinations of such information may include, but are not limited to any of, voice, data, and image terminal apparatus, as well as commonly accessible network processing and companding resources. It is also envisaged that future telephone apparatus and other terminal devices will include apparatus and software in accordance with the previously mentioned patent application Ser. No. 08,982, 925. In addition thereto such telephone apparatus and terminal devices will include means for utilizing IP telephony QOS information. With the knowledge of this discloser those persons skilled in the field of IP telephony will realize other variations and embodiments within the spirit and scope of the invention.

What is claimed is:

1. A method for routing a telephone call via an IP network, responsive to a calling party having initiated a call to a called party, wherein the method includes the step of determining at least one IP network link for transport of packets from the calling party to the called party and at least one IP network link for transport of packets from the called party to the calling party, the method comprising the further steps of:

collecting data relative to characteristics of any real-time transport protocol (RTP) streams having recently been transported via said links;

generating a historical quality of service (QOS) value from the collected data; and setting up the call between the calling and called parties via the IP network, contingent upon the historical QOS value being of at least a predefined QOS;

whereby the setting up an IP network telephony call with a poor QOS is substantially avoided.

2. A method as defined in claim 1 wherein said predefined QOS is a first predefined QOS value, and in an event where the historical QOS value of any link being less than the first predefined QOS value, but greater than a lesser predefined QOS value, allocating a network companding resource to the RTP streams to be transported via said link; and setting up the call between the calling and called parties via said links.

3. A quality of service (QOS) server, in combination with an IP network, being responsive to IP path definitions provided thereto from a private branch exchange (PBX) coupled with the IP network, for from time to time collecting data relative to characteristics of real-time transport protocol streams used for transporting real-time audio data via one or more links in an IP path, wherein said PBX includes an automatic dialler and wherein said IP path definitions are provided by the automatic dialler in the form of IP network endpoint addresses, the QOS server providing collected data relative to said endpoints whereby an automatic dialler defined call set up via the IP network is declined if the QOS is unsatisfactory.

4. A call centre including agent stations, the call centre being responsive to data relative to characteristics of real-time transport protocol streams used for transporting real-time audio data via IP paths in an IP network, for selectively postponing an IP telephone call setup with one of the agent stations in an instance wherein the data indicates a probable QOS of less than a predetermined QOS.

5. A call centre as defined in claim 4 comprising:

a telephone number list for storing prescribed telephone numbers of parties to be called, whereby the call centre performs a call setup in response to a telephone number having been read in the telephone number list;

a deferred list, for recording said telephone number in the event of the call setup being postponed; and a called list for storing each telephone number having been read with the result of an IP telephone call setup with a called party having been performed.

6. A call centre as defined in claim 5 comprising:

means responsive to a completion of a reading of all the numbers in the telephone number list for functionally substituting the deferred list.

7. A call centre as defined in claim 6 comprising:

means being responsive to a signal from an agent station during a progress of a telephone connection following the call setup for causing the telephone number of the called party to be recorded.

8. A call centre being operative in combination with a quality of service (QOS) server, to accommodate outgoing call completions via either of a PSTN or a packet switched network, comprising;

a telephone circuit switching network being coupled via trunk circuits to the PSTN, and being coupled via a gateway means to the packet switched network, the telephone circuit switching network being operable to provide communications channels between any of a plurality of agent stations and the gateway means, and to provide communications channels between any of the plurality of agent stations and the trunk circuits;

a call controller for directing the operations of the telephone circuit switching network for setting up and tearing down telephone calls, such that calls for completion via the trunk circuits are preceded by signalling information specifying at least the telephone number of a called party, and such that calls for completion via the gateway means are preceded by signalling information as to the telephone number of a called party as well as corresponding IP network endpoint address;

an automatic dialler coupled to communicate with the call controller for providing telephone numbers in association with endpoint addresses to the call controller, and coupled with the QOS server, the automatic dialler comprising:

a number list for storing a plurality of telephone numbers along with corresponding endpoint addresses of parties to be called;

a calling list controller for reading and writing the number list and apriori to providing a telephone number for use by the call controller, the calling list controller being operable to request and receive QOS information from the QOS server in relation to the endpoint addresses of said gateway and an endpoint associated with said telephone number, and being operable to decline provisioning of said telephone number in consequence of said QOS information suggesting an insufficient QOS.

9. A call centre as defined in claim 8, the automatic dialler further comprising;

a deferred list, for recording said declined telephone number;

a called list for storing each telephone number read in the telephone number list and resulting in an IP telephone call setup with a called party having been performed; and the calling list controller further comprising:

means responsive to a completion of a reading of all the numbers in the number list for functionally substituting the deferred list; and means being responsive to a signal from an agent station during a progress of a telephone connection following the call setup for causing the telephone number of the called party to be recorded.

10. A method for estimating a telephony quality of service (QOS) between endpoints in an internet protocol (IP) network, comprising the steps of:

coupling a data storage facility with the IP network to act as a quality of service (QOS) server; and responsive to an exchange of signal streams of synchronous orgins at an endpoint,
 a) gathering performance information for a receive signal stream,
 b) gathering route information identifying at least one route having been traversed by said signal stream,
 c) transferring the gathered information to the data storage facility; and in response to each transfer of said gathered information, at the QOS server,
 d) storing the performance information, and the route information;

whereby the stored information are available apriori a call setup for a request of telephone service involving endpoints having at least a potential transport route in common with a route identified in the stored route information, said performance information and route information being operative to determine whether a QOS associated with said telephone service would be greater or less than a prescribed QOS.

11. A method as defined in claim 10 wherein following said request for telephone service, the method comprising the further steps of:

e) identifying IP network endpoints of the calling and called parties, f) transmitting a request for QOS information relative to each of the identified endpoints, g) responsive to said request, in the QOS server, reading any QOS information for which there is at least a potential transport route in common with a route identified in the stored route information, and h) transporting any QOS information, read in step d), to the requester, whereby set up of the requested telephone call via the IP network may be declined if the QOS information appears to indicate less than a prescribed QOS.

12. A method as defined in claim 10, comprising the further step of:

j) coincident with step d), storing the time of each occurrence of step d) in association with said information.

13. A method as defined in claim 12, where in an event of a request of telephone service involving endpoints having at least a potential transport route in common with a route identified in the stored route information, the method comprising the further steps of:

k) dependent upon the time at which the information was stored in step d) not being recent enough, initiating an artificial synchronous session wherein signal streams, simulated to be similar to signal streams of synchronous origins, are exchanged between the endpoints, m) gathering performance information related to the signal streams received at the endpoints, n) gathering route information for the signal streams received at the endpoints, and performing the steps of;

c) transferring the gathered information to the data storage facility; and in response to each transfer of said gathered information, at the QOS server, d) storing the performance information, and the route information.

14. A method as defined in claim 11 wherein step g) is not performed as there is no potential transport route in common with a route identified in the stored route information, the method comprising the further step of:

initiating an artificial synchronous session causing exchanges of signal streams, simulated to be similar to signal streams of synchronous origins, between the endpoints, and thereafter, performing steps beginning with step m) defined in claim 13.

15. A method as defined in claim 10 wherein following said request for telephone service the method comprising the further steps of:

e) identifying IP network endpoints of the calling and called parties, f) transmitting a request for QOS information relative to each of the identified endpoints, p) in the QOS server being responsive to said request such that if there is QOS information for said endpoints transporting the QOS information to the requester.

16. A method as defined in claim 15 where in an event there is no information for one of the endpoints, determining if there is a likely route between the endpoints for which there is QOS information, if so and if the QOS information is recent, inferring the QOS information is appropriate and transporting the inferred QOS information to the requester.

17. A method as defined in claim 16 where in an event there is no inferable information for said endpoint, initiating an artificial synchronous session to acquire QOS information for the endpoint, and transporting the acquired QOS information to the requester.

18. A method as defined in claim 15 where in an event there is no information for one of the endpoints, determining if there is QOS information for a route in common with at least one link through which a signal stream destned for the endpoint would likely be transported, and if so transporting the QOS information to the requester.

19. A method as defined in claim 18 where in an event there is no route in common for said endpoint, initiating an artificial synchronous session to acquire QOS information for the endpoint, and transporting the acquired QOS information to the requester.

20. A method as defined in claim 11, comprising the further step of:

j) coincident with step d), storing the time of each occurrence of step d) in association with said information.

21. A method as defined in claim 20, where in an event of a request of telephone service involving endpoints having at least a potential transport route in common with a route identified in the stored route information, the method comprising the further steps of:

k) dependent upon the time at which the information was stored in step d) not being recent enough, initiating an artificial synchronous session wherein signal streams, simulated to be similar to signal streams of synchronous origins, are exchanged between the endpoints, m) gathering performance information related to the signal streams received at the endpoints, n) gathering route information for the signal streams received at the endpoints, and performing the steps of;

c) transferring the gathered information to the data storage facility; and in response to each transfer of said gathered information, at the QOS server, d) storing the performance information, and the route information.

* * * * *